US010883486B1

(12) United States Patent
Zhou et al.

(10) Patent No.: US 10,883,486 B1
(45) Date of Patent: Jan. 5, 2021

(54) FORCED SURFACE TRAVELING WAVE-DRIVEN MICROFLUIDIC PUMP

(71) Applicants: Huilin Zhou, Hefei (CN); Weixing Lu, Los Angeles, CA (US)

(72) Inventors: Huilin Zhou, Hefei (CN); Weixing Lu, Los Angeles, CA (US)

( * ) Notice: Subject to any disclaimer, the term of this patent is extended or adjusted under 35 U.S.C. 154(b) by 0 days.

(21) Appl. No.: 15/819,883

(22) Filed: Nov. 21, 2017

(51) Int. Cl.
*F04B 43/04* (2006.01)
*H02N 2/08* (2006.01)
*H02N 2/06* (2006.01)

(52) U.S. Cl.
CPC .......... *F04B 43/046* (2013.01); *H02N 2/065* (2013.01); *H02N 2/08* (2013.01)

(58) Field of Classification Search
CPC .......... F04B 43/046; H02N 2/065; H02N 2/08
See application file for complete search history.

(56) References Cited

U.S. PATENT DOCUMENTS

| | | | | |
|---|---|---|---|---|
| 2,213,354 A | * | 9/1940 | Wilson | E04F 17/02 52/127.3 |
| 4,504,760 A | * | 3/1985 | Yamamoto | H02N 2/163 310/317 |
| 4,562,374 A | * | 12/1985 | Sashida | H02N 2/16 310/323.03 |
| 4,768,256 A | * | 9/1988 | Motoda | B60S 1/02 15/250.001 |
| 4,854,836 A | * | 8/1989 | Borsanyi | F04B 43/0072 417/474 |
| 5,148,068 A | * | 9/1992 | Kushida | H01L 41/12 310/323.04 |
| 5,872,418 A | * | 2/1999 | Wischnewskiy | H01L 41/0986 310/323.06 |
| 6,230,738 B1 | * | 5/2001 | Watanabe | F16K 31/004 137/486 |
| 7,764,005 B2 | * | 7/2010 | Xu | H02N 2/08 310/313 R |
| 7,889,877 B2 | * | 2/2011 | Lutz | F04B 43/046 381/190 |
| 9,479,088 B2 | * | 10/2016 | Wischnewskiy | H02N 2/06 |
| 2015/0322932 A1 | * | 11/2015 | Kosa | F04B 19/006 417/413.2 |

OTHER PUBLICATIONS

"Electronic Symbol." Wikipedia, Pssurvival.com, Jan. 3, 2017, 10:21, www.pssurvival.conn/PS/Electronic/Electronic_Symbol-2017.pdf. (Year: 2017).*

* cited by examiner

*Primary Examiner* — Patrick Hamo
*Assistant Examiner* — Joseph S. Herrmann
(74) *Attorney, Agent, or Firm* — Michael D. Eisenberg (57) ABSTRACT

The present invention relates to a microfluidic pump for generating forced traveling waves that can directly drive liquid. A surface traveling wave-driven microfluidic pump comprises a channel with two opposing channel walls. Two symmetric traveling waves are generated on the surface of two opposite channel walls. The channel contains liquid that becomes trapped inside the cavities and is pumped along the direction of the traveling wave at the same speed as the traveling wave.

16 Claims, 8 Drawing Sheets

FORCED SURFACE TRAVELING WAVE-DRIVEN MICROFLUIDIC PUMP

FIELD OF THE INVENTION

The present invention relates to a microfluidic pump for generating forced traveling waves that can directly drive liquid.

BACKGROUND OF THE INVENTION

Microfluidics is the handling and analyzing of fluids in structures of micrometer scale. Constant advances in the field of microfluidic technology have resulted in microfluidic systems being utilized for bioengineering, drug delivery, chemical analysis, military, healthcare, and environmental monitoring purposes. Microfluidic pumps can be divided into two categories: mechanical and non-mechanical. Mechanical pumps include electrostatic pumps, piezoelectric pumps, thermally-driven pumps, magnetic pumps, and shape memory alloy pumps. Non-mechanical pumps include electroosmotic pumps, electrohydrodynamic (EHD) pumps, magnetohydrodynamic pumps, electrowetting-based pumps, and bubble-based pumps. Both categories include pumps that are either too hard to miniaturize or incompatible with certain fluids.

A prior solution includes integrating a surface acoustic traveling wave-driven pump with a microfluidic system. A surface acoustic wave (SAW) with a flexural plate wave is excited on the surface of a piezoelectric thin film (thickness of 1-2 μm) on a channel wall by interdigital (IDT) electrodes. SAW also can be excited by tapping on the surface of the channel using a piezoelectric cantilever. However, these approaches can only excite the traveling wave with a very small amplitude of typically 10-100 nm, which is insufficient to generate an effective pumping force.

All existing approaches for generating a surface acoustic traveling wave on the surface of a beam is to excite the traveling wave at one end of the beam and to absorb the vibration at the other end by an absorber to avoid the reflected waves. A piezoelectric effect is often employed to excite the traveling wave. This method has several disadvantages: 1) wave velocity relates to the material property and cannot be dynamically adjusted; 2) wave propagating direction from excitation end to absorption end cannot be dynamically adjusted; 3) the excited wave is simple harmonic wave with waveform duty cycle unadjusted; and 4) the traveling wave propagation can only be effective in the absence of damping, while used for driving liquid, the traveling wave will attenuate quickly.

The present approach uses a forced surface traveling wave as the driving force. The traveling wave is formed by a series of coordinated forced vibration to avoid the above disadvantages. According to the wave and vibration theory, when applied excitation frequency is much smaller than the resonance frequency, the amplitude of the forced vibration is close to the displacement under static force. The forced vibration excitation is a low-frequency signal and its frequency, velocity, duty cycle, and direction is adjustable.

The present invention solves the miniaturization and incompatibility problems of the prior technologies because it comprises a surface traveling wave-driven microfluidic pump that uses a piezoelectric effect to generate forced traveling waves that can directly drive liquid. The pump has an adjustable driving force and operating frequency, with a wide range of adjustable values, resulting in a precise quantifiability of the pumping effect and an easily controllable transmission direction and flow speed. Further, the pump can be easily miniaturized for microfluidic system integration.

BRIEF SUMMARY OF THE EMBODIMENTS OF THE INVENTION

In a variant, a microfluidic pump comprises a channel having channel walls; a piezoelectric membrane; a membrane electrode; a parallel electrode; and a plurality of n AC voltages. The parallel electrode is divided into groups of n parallel electrodes, which are configured to generate a surface traveling wave when the n AC voltages are applied between each of the n parallel electrodes and the membrane electrode.

In another variant, the piezoelectric membrane comprises a dielectric film.

In a further variant, the membrane electrode comprises an electrically conductive film.

In yet another variant, the n parallel electrodes are connected to an n lead successively.

In another variant, the n AC voltages comprise successive phase differences of $2\pi/n$ and are sequentially connected to a lead of each electrode.

In a further variant, a phase difference between adjacent electrodes are converted to a mechanical vibration of the piezoelectric membrane with the same phase difference.

In a further variant, n≥3.

In yet another variant, the traveling wave has an amplitude and a speed that is proportional to an amplitude and a frequency of the AC voltage, respectively.

In another variant, two channel walls face each other and a liquid is disposed in the channel between the channel walls.

In a further variant, a traveling wave forms on a surface of each channel wall.

In yet another variant, the channel is separated into a plurality of ratcheting points and a plurality of cavities when a distance between the two walls is twice an amplitude of the traveling wave.

In another variant, the ratcheting points push the liquid outward from the cavities in a direction of the traveling wave.

In a further variant, four channel walls enclose the channel.

In yet another variant, a first membrane electrode is disposed below a top channel wall and a second membrane electrode is disposed above a bottom channel wall. A first piezoelectric membrane is disposed below the first membrane electrode and a second piezoelectric membrane is disposed above the second membrane electrode. A first parallel electrode is disposed below the first piezoelectric membrane and a second parallel electrode is disposed above the second piezoelectric membrane. An insulating layer of film is disposed below the first parallel electrode and above the second parallel electrode.

In a further variant, a first parallel electrode is disposed below a top channel wall and a second parallel electrode is disposed above a bottom channel wall. A first piezoelectric membrane is disposed below the first parallel electrode and a second piezoelectric membrane is disposed above the second parallel electrode. A first membrane electrode is disposed below the first piezoelectric membrane and a second membrane electrode is disposed above the second piezoelectric membrane.

In another variant, a Single-Chip Microcomputer (SCM) controls a plurality of DDS chips, which generate signals that are amplified and converted into voltages that generate the traveling wave.

In a further variant, a side length of the channel is ⅓-3 times as much as an amplitude of the traveling wave.

In yet another variant, a length of the channel is equivalent to or larger than a wavelength of the traveling wave.

In another variant, a top channel wall and a bottom channel wall comprise an arcuate shape.

In a further variant, a piezoelectric membrane is disposed on a left side of the channel and on a right side of the channel.

Detailed Description of the Embodiments of the Invention

Figure 1A:
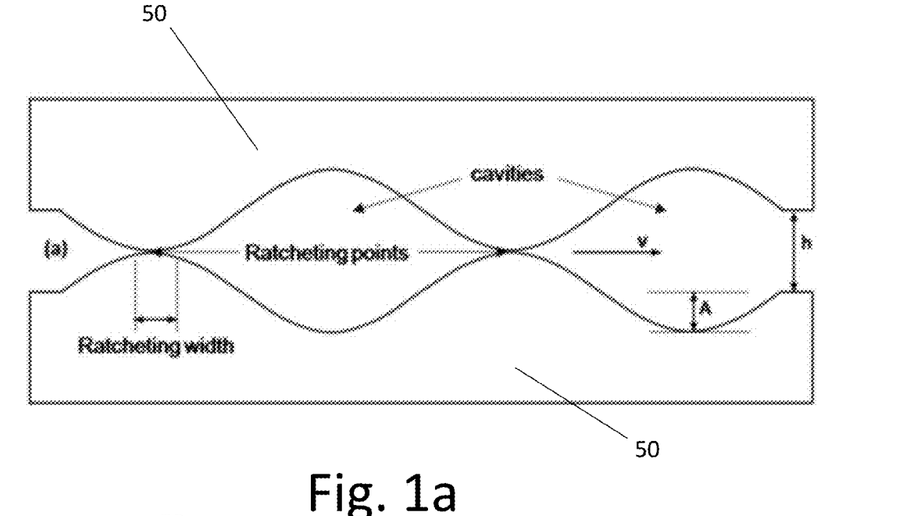
FIG. 1a illustrates a simple harmonic traveling wave-driven pumping effect in a channel between two walls, with a wave duty cycle of 1:1.
Figure 1B:
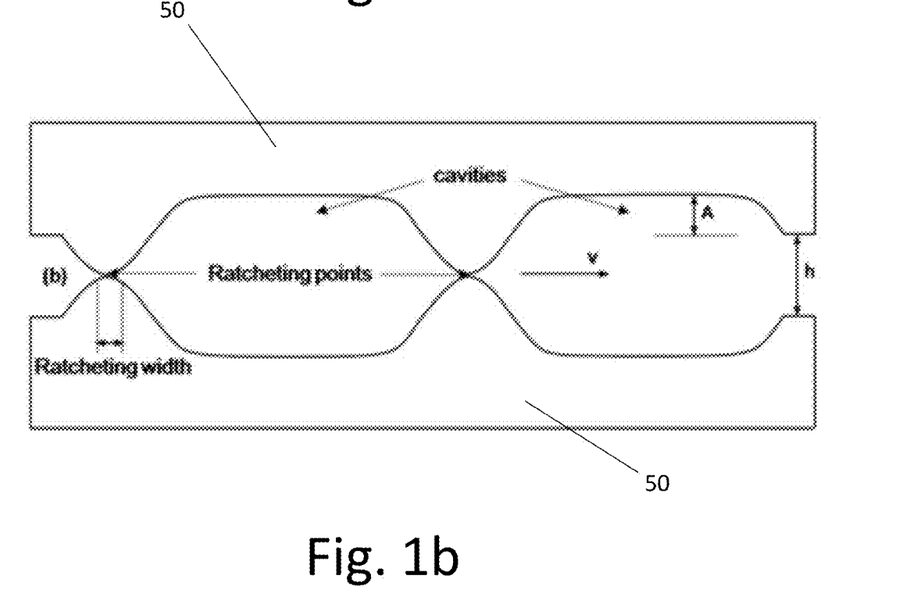
FIG. 1b illustrates a smoothed rectangular traveling wave-driven pumping effect in a channel between two walls, with a wave duty cycle of 3:1.

In a variant, referring to FIGS. 1a and 1b, a surface traveling wave-driven microfluidic pump comprises a channel with two opposing channel walls 50. Two symmetric traveling waves are generated on the surface of two opposite channel walls. When a gap (h) between the two walls is approximately twice the amplitude (A) of the traveling wave, the channel between the two walls dynamically separates into a traveling "ratcheting point/cavity" series of ratcheting points and cavities. The channel contains liquid that becomes trapped inside the cavities because the liquid cannot penetrate the ratcheting point. The liquid is pumped along the direction of the traveling wave at the same speed as the traveling wave, establishing a controlled pumping effect. "V" indicates the velocity (speed) at which the traveling wave and thus the liquid, is traveling.

In another variant, the flow output of the pump depends on the amplitude, velocity, and duty cycle of the traveling wave. FIG. 1a shows an example of a simple harmonic traveling wave with a duty cycle of 1:1. FIG. 1b conveys an example of a smoothed rectangular traveling wave with a duty cycle of 3:1. FIGS. 1a and 1b show that the higher the duty cycle, the higher the pumping capacity of the pump.

In a further variant, the pumping pressure of the pump depends on the pushing pressure of the ratcheting points, ratcheting width, and the number of traveling waves within the gap. When the length of the gap is identical to a wavelength of the traveling wave, then there will be a movement of a ratcheting point during the traveling wave moving process. The moving ratcheting point will partition the channel into sub-sections, "moving cavities," and push forward the liquid from the moving cavities. When the gap length is identical to two wavelengths of the traveling wave, there will be two moving ratcheting points to push forward liquid from two moving cavities. The more moving ratcheting points, the greater the output pressure.

In yet another variant, the gap between the two walls is greater than two times the amplitude of the traveling wave. Since the ratcheting point will not fully engage, the liquid will reverse leakage and output capacity will be reduced due to the effect of back pressure. However, as long as the opening of the ratcheting point is small, for example a few micrometers, or even tenths of a micrometer, the reverse flow will undergo a significant viscous drag because the microfluidic Reynolds number is very small so that the inertial force of the fluid is negligible and viscosity is dominated. The reverse leakage will be obstructed when the liquid flows through the narrow channel. The pump will still have a strong forward transmission capacity. This pump requires a hydrophilic channel surface, otherwise a hydrophobic force will prevent the liquid from entering the traveling wave channel.

Figure 2:
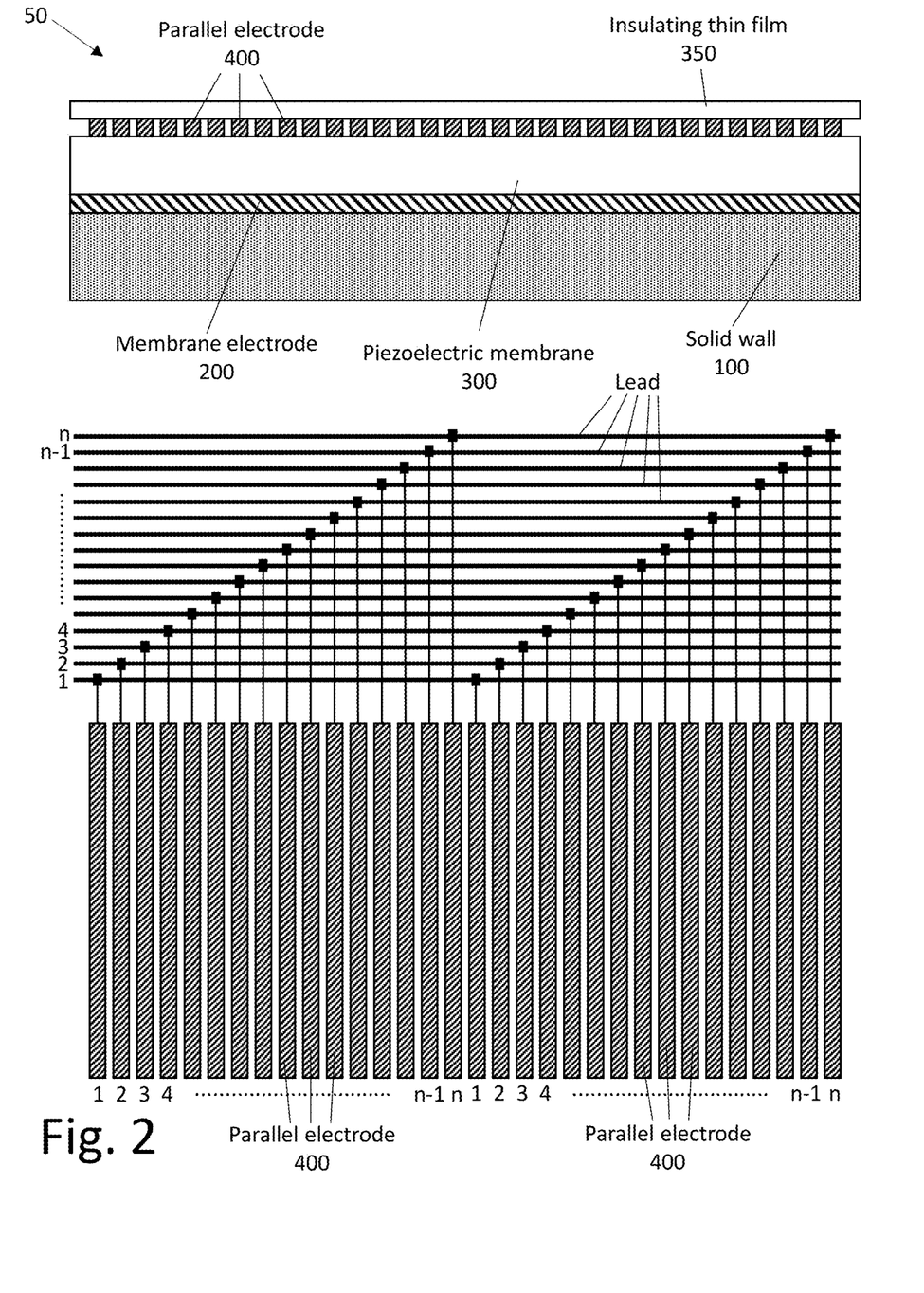
FIG. 2 illustrates a structure for generating a forced traveling wave, including n parallel electrodes connected to an n lead successively.

In another variant, referring to FIG. 2, a thin conductive layer is coated on one side of the piezoelectric membrane 300 as a membrane electrode 200, while a comb-shaped parallel electrode 400 is printed on the other side. The piezoelectric membrane 300 comprises a dielectric film. An insulating thin film 350 is coated on top of the parallel electrode 400 as a protective layer. The comb-shaped parallel electrodes 400 are divided into a number of groups that contain n adjacent parallel electrodes. The n parallel electrodes of each group are connected to the n leads successively.

In a further variant, an AC voltage with the same amplitude and frequency but different phases is applied in between each of the n parallel electrodes 400 and membrane electrode 200. The phase difference between any two adjacent parallel electrodes 400 is $2\pi/n$ successively. The piezoelectric film 300 interposed between each of the n parallel electrodes 400 and the membrane electrode 200 under the AC voltage will vibrate sinusoidally. Due to the phase difference, the n parallel electrodes 400 will generate an overall surface traveling wave from left to right if the phase increases by $2\pi/n$ from the left electrode to the right, and vice versa. The amplitude and speed of the traveling wave is proportional to the amplitude and frequency of the applied AC voltage respectively. The waveform and speed of the generated surface traveling wave can be adjusted by regulating the waveform and frequency of the applied AC voltage.

In another variant, the traveling wave has a lower frequency than the intrinsic frequency of the piezoelectric membrane 300 and can reach 0 Hz.

In yet another variant, referring to FIGS. 1a, 1b, 3a, and 3b, the driving voltage forms traveling waves, assuming that the applied voltage shrinks the thickness of the piezoelectric film/membrane 300.

Figure 3A:
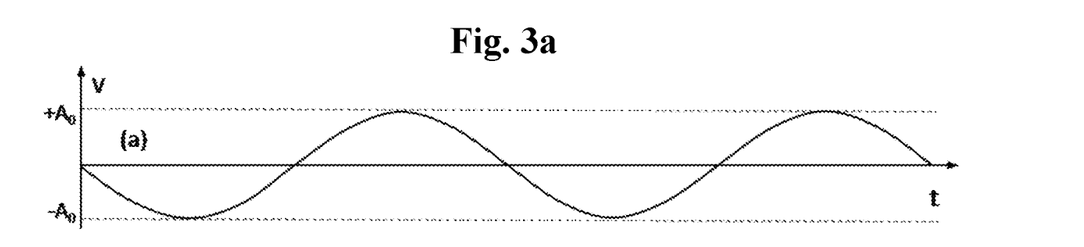
FIG. 3a illustrates a sinusoidal AC wave with a wave duty cycle of 1:1.
Figure 3B:
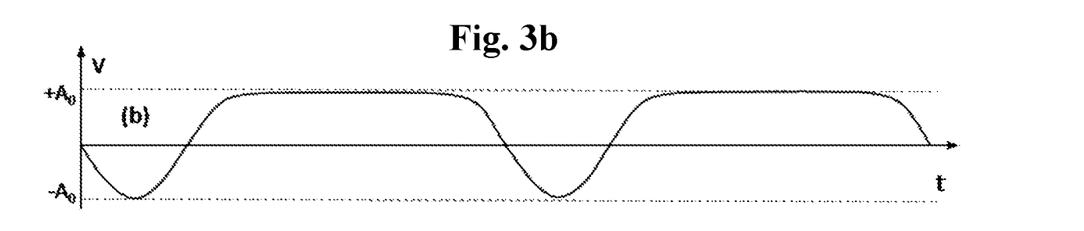
FIG. 3b illustrates an AC waveform with a duty cycle of 3:1.
Figure 3C:
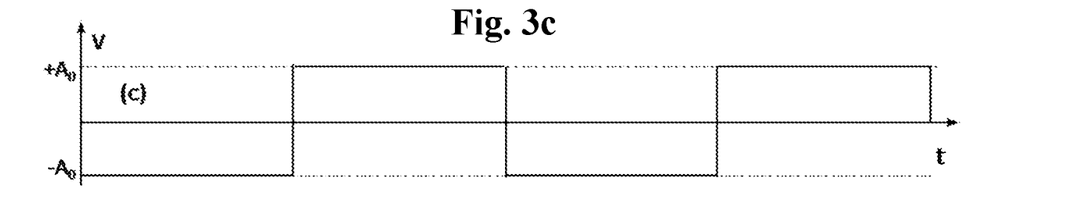
FIG. 3c illustrates a rectangular AC waveform.

In another variant, referring to FIG. 3c, a rectangular AC wave serves as the driving force for the forced surface traveling wave and produces a continuous and smooth waveform without a sharp rectangular drop because the material can only result in continuous deformation. However, the rectangular AC wave will generate a surface traveling wave with a larger energy density compared to the sinusoidal AC wave.

A Group of AC Voltages with a Phase Difference of $2\pi/n$

Figure 4A:
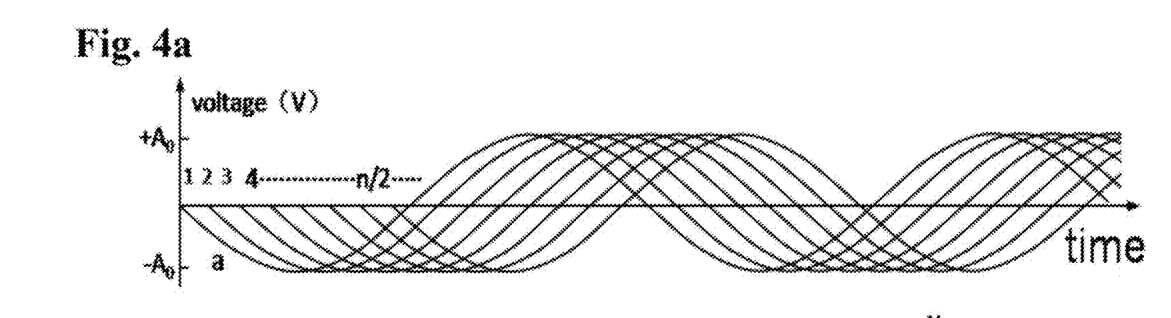
FIG. 4a illustrates a mechanical traveling wave generated by n AC voltages with n successive phase difference of $2\pi/n$, where n=16.

In a further variant, referring to FIGS. 3a, 3b, and 4a, the driving AC voltage will have a higher pumping capacity when its waveform has a higher duty cycle. For instance, the pumping capacity of the driving voltage in FIG. 3b is greater than the one in FIG. 3a. Applying n AC voltage with a successive phase difference of $2\pi/n$ as the driving source, wherein n is an integer rational number greater than or equal to 3 and an aliquot number of 360, such as 3, 4, 5, 6, 8, 12, 16, etc., will generate a mechanical traveling wave on the surface of the piezoelectric membrane 300. The large n needs an excessive complex drive circuit, while the small n results in mechanical waveform distortion. Thus, the n should be a reasonable number and is recommended to be 16. It may have many other methods to generate AC voltages with n successive phase difference of $2\pi/n$, such as a direct digital synthesis method.

A Group of AC Voltages with a Time Phase Difference

Figure 4B:
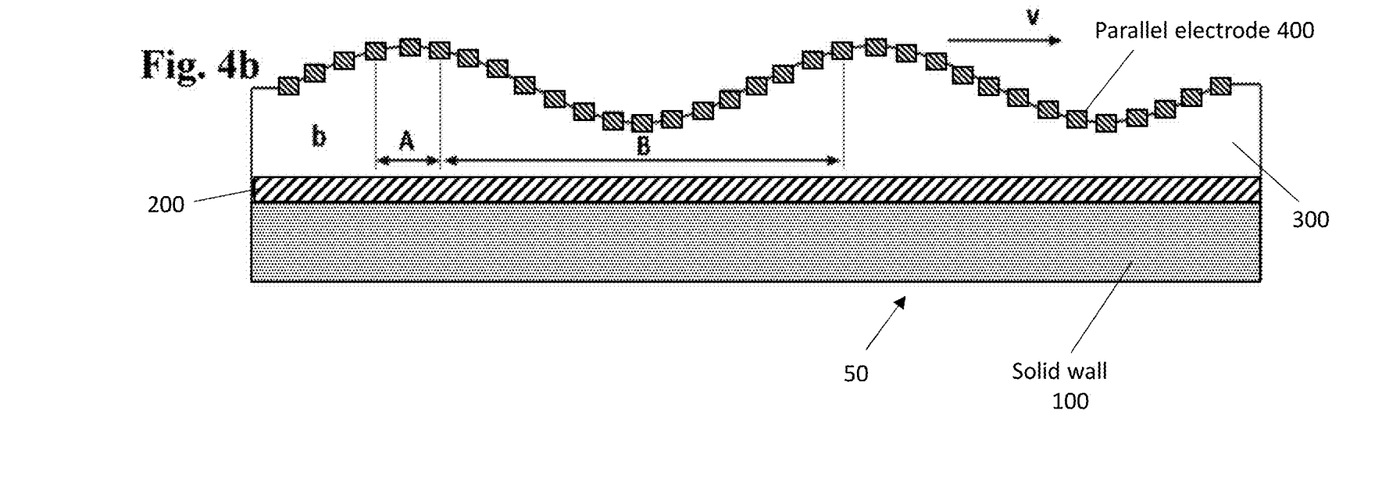
FIG. 4b illustrates a surface traveling wave with a ratcheting point and a cavity.

In yet another variant, referring to FIGS. 2 and 4b, n AC voltages with successive phase differences of $2\pi/n$ are connected in sequence to the electrode leads. The AC voltages between the electrode leads and the membrane electrode 200 will cause the piezoelectric film 300 underneath to vibrate. The phase difference between adjacent electrodes 400 will be converted to a mechanical vibration of the piezoelectric material with the same phase difference. Thus, the electrodes 400 vibrate simultaneously with the piezoelectric material underneath. All n electrode leads will coordinately vibrate and form a surface traveling wave. The same traveling wave can be formed on the opposite channel wall simultaneously. Unlike the conventional free surface acoustic wave (SAW) generated on the surface of the piezoelectric substrate that usually has high-frequency (ultrasound range) with a small amplitude, fixed velocity (depending on the material used), and a wavelength inversely proportional to the frequency, the forced surface traveling wave has a low frequency, large amplitude, adjustable velocity, variable waveform, and is adjustable.

Velocity of the Forced Traveling Wave

In a further variant, if the length of the group (n) electrodes 400 is l and frequency of the AC voltages is f, the AC voltages in a period will make the mechanical traveling wave to travel just a wavelength that equal to the length of the group (n) electrodes, so the velocity (v) of the forced traveling wave is:

$$v=l \times f$$

Assuming l=10 mm, frequency $f=10^2$, then the velocity of the forced traveling wave v=1 m/s. Due to the velocity is proportional to the frequency; it can be adjusted through frequency over a wide range.

Amplitude of the Forced Traveling Wave

In a further variant, assuming that the amplitude of AC voltages is $A_0$, the deformation rate of piezoelectric material per unit electric field is μ, and the thickness of the piezoelectric film/membrane 300 is t, then the amplitude of the forced traveling wave is:

$$A=(A_0/t) \times \mu \times t = A_0 \times \mu$$

In yet another variant, $Pb(A_{1/3}B_{2/3})PbTiO_3$ piezoelectric single crystals ($A=Zn^{2+}$, $Mg^{2+}$) has a maximum strain rate>1.7%. If the thickness of the piezoelectric crystal is 4 mm, then its total maximum strain is 4 mm×1.7%=68 μm. Thus, the gap between the two channel walls can be up to 68 μm. The electro-active polymers (EAP) can achieve 10% deformation rate at a low voltage, so it is a great candidate as well for the forced traveling wave application.

Duty Cycle

In another variant, referring to FIGS. 3a, 3b, 3c, and 4b, duty cycle is the area ratio of the cavity area vs. the ratcheting point protrusion area. The duty cycle of driving voltage can be arbitrarily regulated in a wide range, but the response range of piezoelectric materials is limited. When the wavelength is fixed, the higher the duty cycle, the steeper the ratcheting point protrusion of the forced traveling wave, and the higher the shear strain. Due to the shear force being proportional to the shear strain, the shear strain will reach a maximum value when the shear force increases to the value of balancing the driving force. The maximum shear strain corresponds to the maximum steepness of the ratcheting point. In this case, the bite force of the ratcheting point is zero, resulting in a decrease of pumping pressure and capability. Therefore, the effective duty cycle only can be adjusted within a certain range. Similarly, if the spatial period of the parallel electrodes 400 is too short, shear stress between two adjacent electrodes 400 will interfere with the vibration of the two electrodes 400 resulting in the maximum amplitude drop. The boundary electrodes are also limited by any possible non-movable borders and cannot vibrate with maximum amplitude either. In this case, the length of the n parallel electrodes 400 should be at least 1.5 wavelength long to ensure having a ratcheting point in the channel at any time.

Pumping Capacity Calculation

In a further variant, assuming the duty cycle of the driving AC voltage is d, the gap of two opposite channel walls is h, the width of the pump channel is w, and the length of the group (n) electrodes is l, equal to the wavelength of the traveling wave, then the pumping capacity (c) in one vibration period will be:

$$c=2 \times h \times w \times l \times d/(d+1)$$

The total capacity per unit time (flow rate) (C) will be c multiplied by vibration frequency f.

$$C=c \times f=[2 \times h \times w \times l \times d/(d+1)] \times f$$

For example, if the gap h=60 μm, w=4 mm, l=10 mm, the duty ratio d=2 (2:1), the frequency f=102, then the flow rate C=320 mm$^3$/s. The flow rate can be precisely controlled by adjusting the frequency linearly and quantitatively.

Flow Output and Flow Control

In yet another variant, the flow rate is proportional to the frequency so the flow output can be adjusted by adjusting the frequency within a large range. The forced traveling wave direction and flow direction can also be controlled by simply reversing the phase difference between the electrodes 400 from positive to negative. In addition, the pump can be closed as a valve by applying a constant voltage between the parallel electrodes 400 and the membrane electrode 200.

Figure 5A:
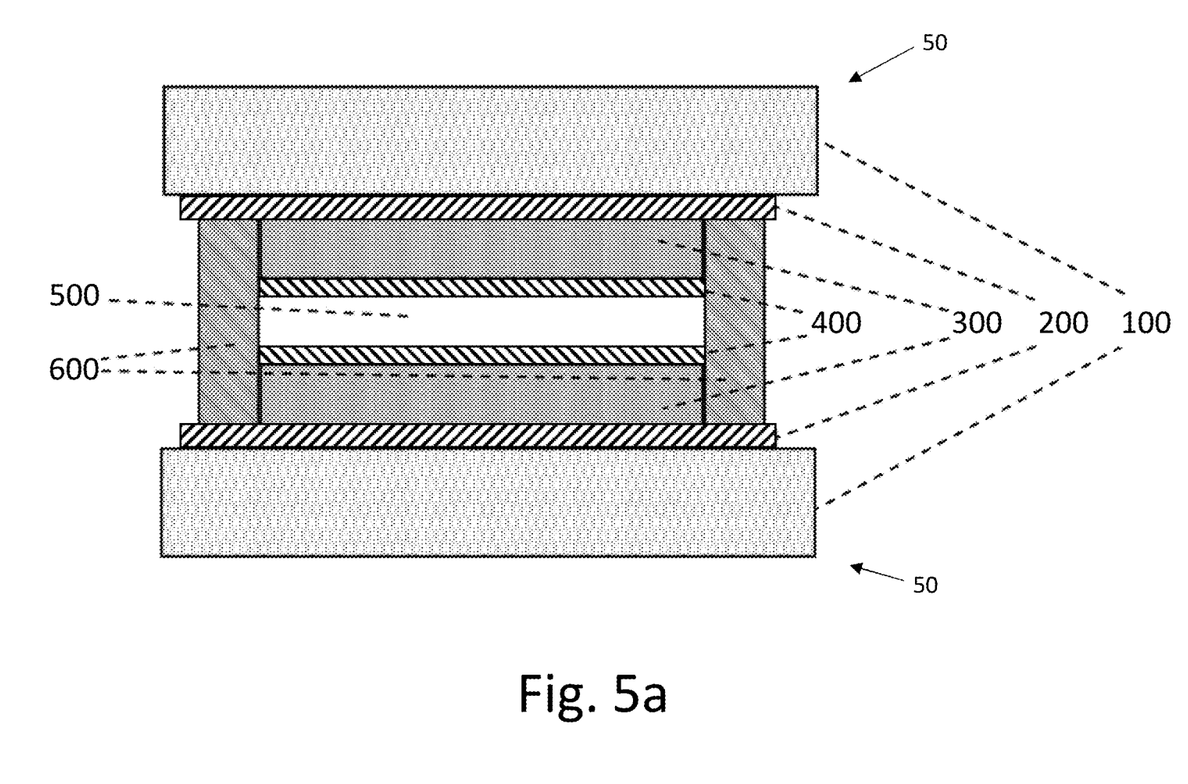
FIGS. 5a and 5b illustrate different structures of a pump.
Figure 5B:
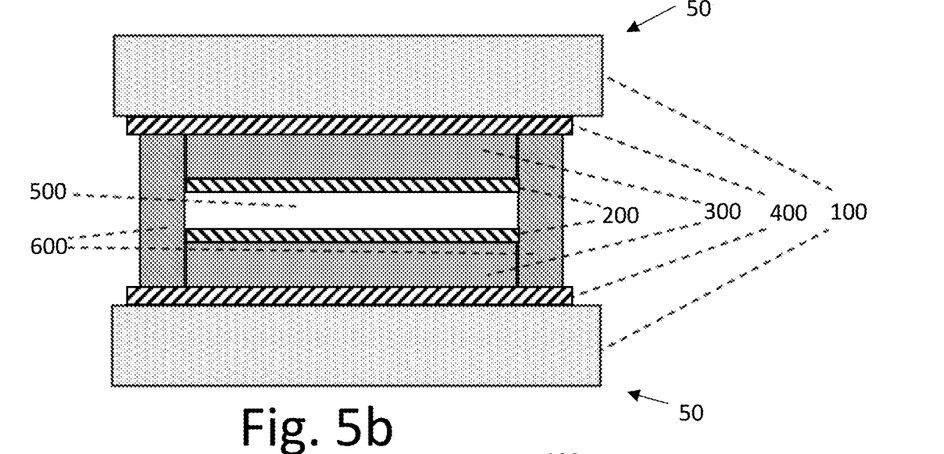

In another variant, referring to FIG. 5a, the pump structure has two membrane electrodes 200, each attached onto a solid channel wall 100. A piezoelectric film/membrane 300 is attached below the membrane electrode 200 of the top channel wall 50 and above the membrane electrode 200 of the bottom channel wall 50. A parallel electrode 400 is disposed on each piezoelectric film/membrane 300 facing the channel. There is a channel gap 500 between the parallel electrodes 400 and enclosed by two side walls 600. It is also functional if the membrane electrodes 200 and parallel electrodes 400 switch places, as seen in FIG. 5b. The size of the piezoelectric film/membrane 300 is w×h×l=4 mm×3 mm×40 mm. The width of the parallel electrode 400 is 0.7 mm, and the channel gap 500 is 0.3 mm. 16 parallel electrodes 400 form a group. The piezoelectric film/membrane 300 has a length of 40 mm that can accommodate 2.5 wavelengths. The pump size can be further miniaturized as necessary. For instance, it is feasible to fabricate a workable pump with a size as small as (width)2 mm×(length)4 mm× (height)2 mm, which can be embedded in a complex microfluidic chip as a pump or a valve. Two side walls 600 are fixed on both sides of the channel gap 500 to seal the channel and to maintain close contact with solid channel walls 100 and piezoelectric membrane 300 with an engagement lever of less than 2 μm.

Figure 6:
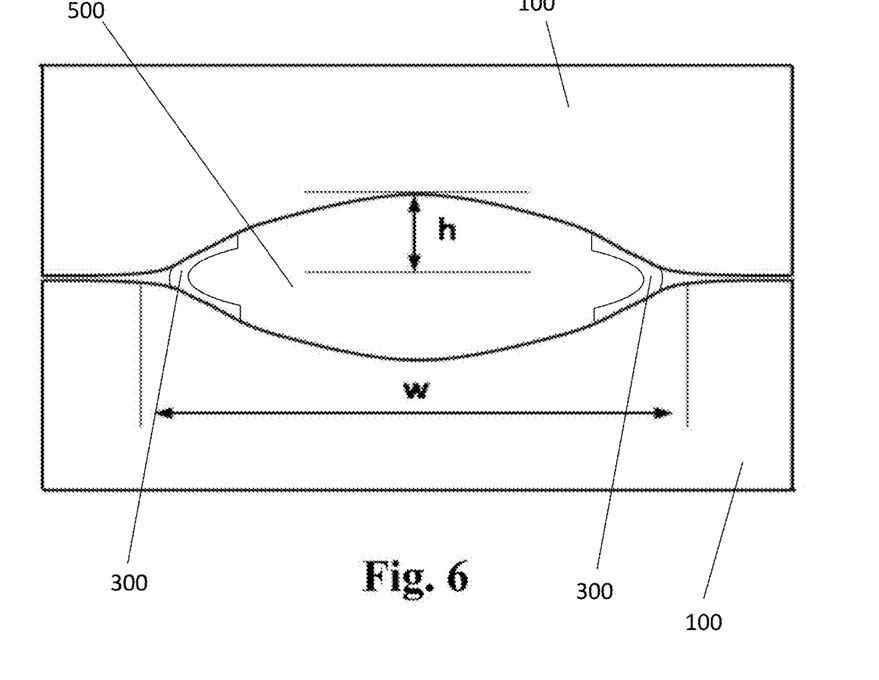
FIG. 6 illustrates a structure of an arcuate channel.

In another variant, referring to FIG. 6, two solid walls 100 are designed with the shape of an arcuate surface. Instead of two side walls, two piezoelectric films 300 are able to directly engage on both sides to form a closed channel and to keep effective arcuate channel gap 500 in the middle. It is feasible to design an arcuate channel with a size of w=4 mm and h=30 μm. This arcuate channel is hard to fabricate but easy to assemble.

In a further variant, controlled by a Single-Chip-Microcomputer (SCM), a group of DDS chips generate 16 sinusoidal signals with a successive phase difference of π/8. These signals are amplified by a high-voltage operational amplifier (op amp) to form 16 sinusoidal voltages with an amplitude of 100 V and a successive phase difference of π/8. These amplified voltages are sent to the 16 parallel electrodes. The piezoelectric films will generate directional mechanical traveling wave under the 16 sinusoidal voltages to move fluid forward.

Figure 7:
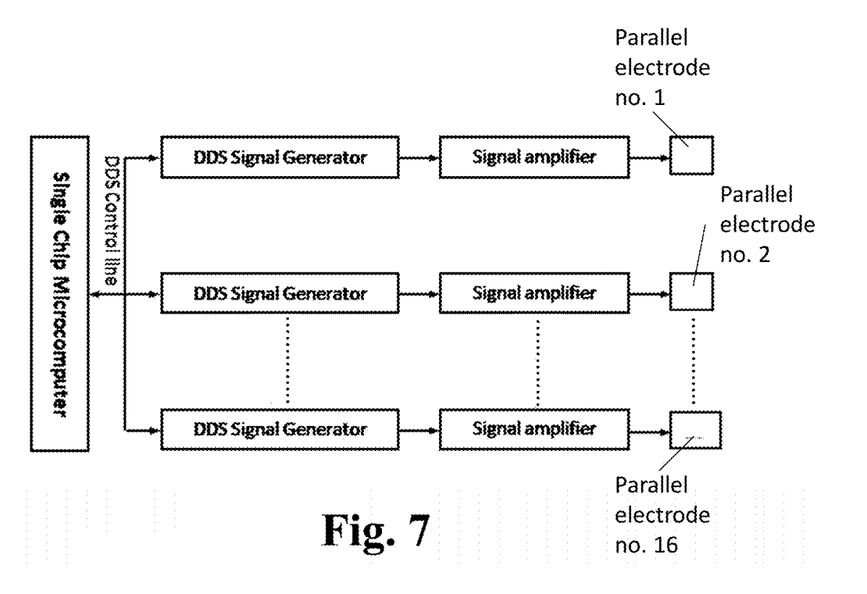
FIG. 7 illustrates a block diagram of a driving circuit.

In yet another variant, referring to FIG. 7, the driving circuit mainly consists of the following three parts: DDS signal generators, signal power amplifiers, and an SCM.

Figure 8:
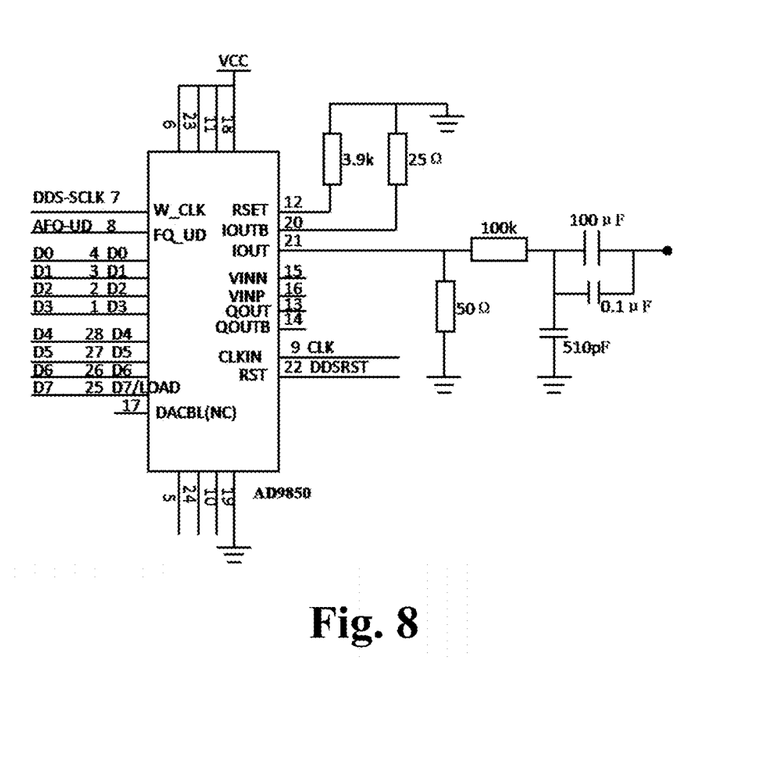
FIG. 8 illustrates a DDS signal generator.

In another variant, referring to FIG. 8, DDS signal generators include 16 AD9850 direct digital frequency synthesizers. This DDS signal generator is very cost-effective because it can generate a signal up to 62.5 MHz with a 32 bit frequency resolution (i.e. the resolution of 125 MHz is only 0.0291 Hz). The obtained phase accuracy can be 11.25 degrees. It is also able to transmit a total length of 40 bit control word using 8-bit parallel or serial transmission mode. In order to achieve a fast update frequency, the circuit design can use parallel transmission mode, so DDS frequency and phase control word update can be achieved by only 5 bytes. In order to save bus resources, 8-bit data lines, the reset line, and the serial clock line are shared by 16 DDS chips. An additional data refresh control line FQ-UD is needed.

Figure 9:
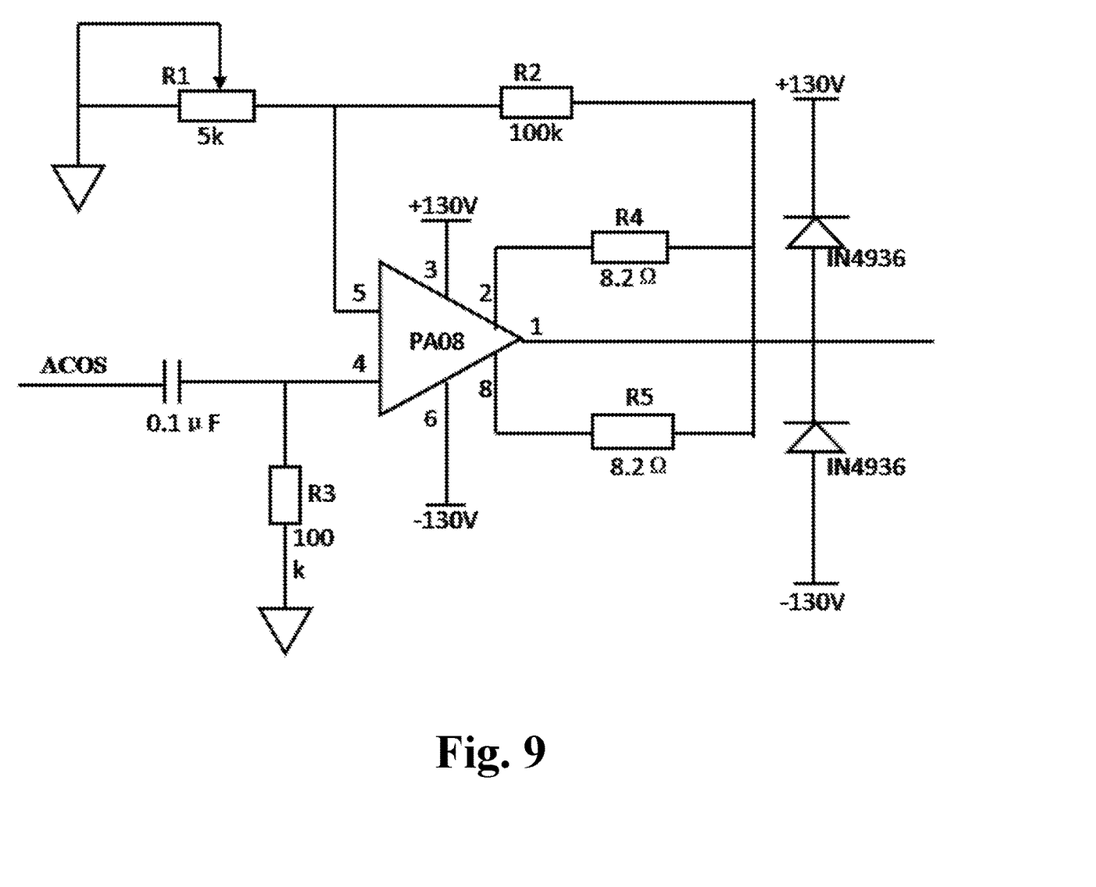
FIG. 9 illustrates a block diagram of a driving circuit.

In a further variant, referring to FIG. 9, the amplifiers include 16 PA08 high voltage op amp. The PA08 chip is packaged with 8-pin TO3. Its output current is ±150 mA under a voltage between ±15V and ±150V. Its gain-bandwidth is 5 MHz at the frequency of 1 MHz. This chip is basically no different with ordinary op amp. Taking into account the load characteristics of a piezoelectric material, ultrafast recovery diodes withstanding voltage above 200V are added to protect the output of op amp against circuit reverse resonance voltage when it exceeds the maximum 300V of the op amp chip. In addition, the chip is protected by introducing two external resistors to limit the output current. The amplitude of the output signal can be easily changed by adjusting the op amp's gain.

REFERENCES

[1] Abhari F, Jaafar H, Yunus N A M. A comprehensive study of micropump technologies. International Journal of Electrochemical Science. 2012, 7:9765-9780.

[2] Amirouche F, Zhou Y Johnson T. Current micropumptechnologies and their biomedical applications. Microsystem Technologies. 2009, 1 5(5):647-666.

[3] Stemme E, Stemme G. A valveless diffuser/nozzle based fluid pump. Sensors and Actuators A. 1993, 39: 159-167.

[4] Pol van de F C M, Lintel van HT G, Elwenspoek M, et al. A thermopneumaticmicropump based on micro-engineering techniques. Sensors and Actuators A: Physical. 1990, 21(1-3): 198-202.

[5] Shoji S, Esashi M. Microflow devices and systems. Journal of Micro mechanics and Microengineering. 1994, 4:157-171.

[6] Maluf N, Williams K. An introduction to microelectromechanical systems engineering. Artech House Publishers. 2004.

[7] Makino E, Mitsuya T, Shibata T. Micromachining of TiNi shape memory thinfilm for fabrication of micropump. Sensors and Actuators A: Physical. 2000 79: 251-259.

[8] Benard W L, Kahn H, Heuer A H, et al. Thin film shape memory alloy actuated micropumps. Journal of Microelectromechanical Systems. 1998, 7(2):245-251.

[9] Bernard W L, Kahn H, Heuer A H, et al. A titanium-nickel shape-memory alloy actuated micropump. International Conference on Solid State Sensors and Actuators, IEEE, Chicago, 1997, 361-364.

[10] Ai Y Yalcin S E, Gu D, et al. A low-voltage nano-porous electroosmotic pump. Journal of Colloid and Interface Science. 2010, 350:465-470.

[11] Rouabah H A, Park B Y, Zaouk R B, et al. Design and fabrication of anac-electro-osmosis micropump with 3D high-aspect-ratio electrodes using only SU-8. Journal of Micromechanics and Microengineering. 2011, 21(3): 035018-035027.

[12] Richter A, Sandmaier H. A micromachined electrohydrodynamic (EHD) pump. Proceeding of MEMS. 1990, 99-104.

[13] Eijkel J c T'Dalton C, Hayden C J, et al. A circular ac magnetohydrodynamicmicropump for chromatographic applications. Sensors and Actuators B: Chemical. 2003, 92(1-2): 215-221.

[14] Colgate E, Matsumoto H. An investigation of electrowetting-based microactuation. Journal of Vacuum Science and Technology A. 1990, 8(4): 3625-3633.

[15] Yun K S, Cho I J, Bu J U, et al. A surface-tension driven micropump for low voltage and low power operations. IEEE Journal of MEMS. 2002, 11(5):454-461

[16] Geng X, Yuan H, Oguz H N, et al. Bubble-based micropump for electrically conducting liquids. Journal of Micromechanics and Microengineering. 2001, 11:270-276.

[17] P. Luginbuhl, S. D. Collins, et al. Microfabricated Lamb Wave Device Based on PZT Sol-Gel Thin Film for Mechanical Transport of Solid Particles and Liquids. J. Microelectromech. Sys. Vol. 6, pp. 337 (1997).

[18] Ogawa J, Kanno I, Korera H, et al. Development of liquid pumping devices using vibrating microchannel walls. Sensors and Actuators A: Physical. 2009, 152: 211. 218.

[19] Kanno I, Kawanno S, Yakushihi S, et al. Characterization of piezoelectric micropump driven by traveling waves. Proceedings of 7th International Conference on Miniaturized Chemical and Biochemical Analysis Systems. 2003, 997-999.

[20] Latham T w. Fluid motions in a peristaltic pump. SM Thesis of Massachusetts Institute of Technology. 1966.

[21] Yin F C P, Fung Y C. Comparison of theory and experiment in peristaltic transport. Journal of Fluid Mechanics. 1971, 47: 93-112

What is claimed is:

1. A microfluidic pump, comprising:
    a top channel wall comprising:
        a top solid wall;
        a top piezoelectric membrane located below the top solid wall and joined to the top solid wall along a longitudinal length of the top piezoelectric membrane;
        a top membrane electrode;
        a plurality of top parallel electrodes;
    a bottom channel wall comprising:
        a bottom solid wall;
        a bottom piezoelectric membrane located above the bottom solid wall and joined to the bottom solid wall along a longitudinal length of the bottom piezoelectric membrane, such that a channel gap is located between the top piezoelectric membrane and the bottom piezoelectric membrane;
        a bottom membrane electrode;
        a plurality of bottom parallel electrodes;
    wherein:
    the bottom piezoelectric membrane has a first surface and a second surface opposite to each other, one of which faces the bottom solid wall, the first surface of the bottom piezoelectric membrane being coated by the bottom membrane electrode and the second surface of the bottom piezoelectric membrane being coated by the plurality of bottom parallel electrodes;
    the top piezoelectric membrane has a first surface and a second surface opposite to each other, one of which faces the top solid wall, the first surface of the top piezoelectric membrane being coated by the top membrane electrode and the second surface of the top piezoelectric membrane being coated by the top parallel electrodes;
    the plurality of bottom parallel electrodes are divided into at least one group of n bottom parallel electrodes arranged in sequence from a first bottom parallel electrode to an nth bottom parallel electrode, and each of the bottom parallel electrodes in each group is configured to be connected to a respective bottom lead applying a respective one of n AC voltages, wherein the n AC voltages have the same amplitude and frequency but respective different phases between the n bottom parallel electrodes of each group and the bottom membrane electrode, and the n AC voltages cause respective varying deformations of a thickness of the bottom piezoelectric membrane, such that a first surface traveling wave is generated at the surface of the bottom piezoelectric membrane which faces away from the bottom solid wall;
    the plurality of top parallel electrodes are divided into at least one group of n top parallel electrodes arranged in sequence from a first top parallel electrode to an nth top parallel electrode, and each of the top parallel electrodes in each group is configured to be connected to a respective top lead applying a respective one of n AC voltages, wherein the n AC voltages have the same amplitude and frequency but respective different phases between the n top parallel electrodes of each group and the top membrane electrode, and the n AC voltages cause respective varying deformations of a thickness of the top piezoelectric membrane, such that a second surface traveling wave is generated at the surface of the top piezoelectric membrane which face away from the top solid wall.

2. The microfluidic pump of claim 1, wherein the top piezoelectric membrane and bottom piezoelectric membrane each comprise respective dielectric films.

3. The microfluidic pump of claim 1, wherein the top membrane electrode and the bottom membrane electrode comprise respective electrically conductive films.

4. The microfluidic pump of claim 1, wherein:
    a difference between phases of AC voltages applied between any two successive top parallel electrodes and the top membrane electrode is $2\pi/n$; and
    a difference between phases of AC voltages applied between any two successive bottom parallel electrodes and the bottom membrane electrode is $2\pi/n$.

5. The microfluidic pump of claim 4, wherein $n \geq 3$.

6. The microfluidic pump of claim 1, wherein the first and second traveling waves have respective amplitudes and speeds that are proportional to the amplitudes and equal to the frequencies of the respective n AC voltages, respectively.

7. The microfluidic pump of claim 1, wherein the top piezoelectric membrane and the bottom piezoelectric membrane face each other and a liquid is configured to be disposed in the channel gap between the top piezoelectric membrane and the bottom piezoelectric membrane.

8. The microfluidic pump of claim 1, wherein the channel gap is separated into a plurality of ratcheting points where the top channel wall and bottom channel wall touch each other, and a plurality of cavities are defined between successive ratcheting points.

9. The microfluidic pump of claim 8, wherein the ratcheting points travel to push the liquid along the channel gap in a direction of both the first surface traveling wave and the second surface traveling wave.

10. The microfluidic pump of claim 8, wherein a maximal distance between the top channel wall and the bottom channel wall in the cavities is twice the amplitude of the first surface traveling wave.

11. The microfluidic pump of claim 1, comprising two side walls, such that the two side walls, the top channel wall, and the bottom channel wall enclose the channel gap.

12. The microfluidic pump of claim 11, wherein
    the top membrane electrode is disposed between the top solid wall and the top piezoelectric membrane;
    the bottom membrane electrode is disposed between the bottom solid wall and the bottom piezoelectric membrane;
    the top plurality of parallel electrodes are disposed on a bottom surface of top piezoelectric membrane;
    the bottom plurality of parallel electrodes are disposed on a top surface of the bottom piezoelectric membrane.

13. The microfluidic pump of claim 12, wherein:
    a top insulating layer of film is disposed below the top plurality of parallel electrodes and covers the top parallel electrodes;
    a bottom insulating later of film is disposed above the bottom plurality of parallel electrodes and covers the bottom parallel electrodes.

14. The microfluidic pump of claim 11, wherein
    the top plurality of parallel electrodes are disposed between the top solid wall and the top piezoelectric membrane;
    the bottom plurality of parallel electrodes are disposed between the bottom solid wall and the bottom piezoelectric membrane;
    the top membrane electrode is disposed on a bottom surface of the top piezoelectric membrane;

the bottom membrane electrode is disposed on a top surface of the bottom piezoelectric membrane.

15. The microfluidic pump of claim 1, wherein a length of the channel gap is equivalent to or larger than a wavelength of the first surface traveling wave.

16. A microfluidic pump, comprising:
- a top solid wall and a bottom solid wall having arcuate shapes, such that the top solid wall and the bottom solid wall directly engage with each other on respective lateral sides form a channel gap in the middle;
- a left piezoelectric membrane located on a left lateral side of the channel gap, and joined to the top solid wall and the bottom solid wall;
- a left membrane electrode;
- a plurality of left parallel electrodes;
- a right piezoelectric membrane located on a right lateral side of the channel gap, and joined to the top solid wall and the bottom solid wall;
- a right membrane electrode;
- a plurality of right parallel electrodes;

wherein:
- the left piezoelectric membrane has a first surface and a second surface opposite to each other, one of which faces the left lateral sides of the top solid wall and of the bottom solid wall, the first surface of the left piezoelectric membrane being coated by the left membrane electrode and the second surface of the bottom piezoelectric membrane being coated by the plurality of left parallel electrodes;
- the right piezoelectric membrane has a first surface and a second surface opposite to each other, one of which faces the right lateral sides of the top solid wall and of the bottom solid wall, the first surface of the right piezoelectric membrane being coated by the right membrane electrode and the second surface of the right piezoelectric membrane being coated by the right plurality of parallel electrodes;
- the left plurality of parallel electrodes are divided into at least one group of n left parallel electrodes arranged in sequence from a first left parallel electrode to an nth left parallel electrode, and each of the left parallel electrodes in each group is configured to be connected to a respective left lead applying a respective one of n AC voltages, wherein the n AC voltages have the same amplitude and frequency but respective different phases between the n left parallel electrodes of each group and the left membrane electrode, and the n AC voltages cause respective varying deformations of a thickness the left piezoelectric membrane, such that a first surface traveling wave is generated at one of the surfaces of the left piezoelectric membrane which faces away from the left lateral sides of the top solid wall and the bottom solid wall;
- the right plurality of parallel electrodes are divided into at least one group of n right parallel electrodes arranged in sequence from a first right parallel electrode to an nth right parallel electrode, and each of the right parallel electrodes in each group is configured to be connected to a respective right lead applying a respective one of n AC voltages, wherein the n AC voltages have the same amplitude and frequency but respective different phases between the n right parallel electrodes of each group and the right membrane electrode, and the n AC voltages cause respective varying deformations of a thickness of the right piezoelectric membrane, such that a second surface traveling wave is generated at one of the surfaces of the right piezoelectric membrane which faces away from the right lateral sides of the top solid wall and the bottom solid wall.

* * * * *